United States Patent [19]
Achter et al.

[11] Patent Number: 5,566,569
[45] Date of Patent: Oct. 22, 1996

[54] DETECTION OF UNPRESSURIZED MOVING CONTAINERS

[75] Inventors: Eugene K. Achter, Lexington; Glenn Gray, Woburn; Helmut W. Klotzsch, Groton; David Lieb, Lexington, all of Mass.

[73] Assignee: Thermedics Detection Inc., Chelmsford, Mass.

[21] Appl. No.: 297,640

[22] Filed: Aug. 29, 1994

[51] Int. Cl.⁶ .............................. G01M 3/36; G01M 3/02; G01M 3/38
[52] U.S. Cl. .................. 73/37; 73/37.5; 73/37.6; 73/37.8; 73/52
[58] Field of Search ............................ 73/37, 37.5, 37.6, 73/37.8, 49.3, 52, 45.4, 78, 81

[56] References Cited

U.S. PATENT DOCUMENTS

| | | |
|---|---|---|
| 1,590,736 | 6/1926 | Clark ........................................ 73/49.3 |
| 3,837,215 | 9/1974 | Massage ................................... 73/49.3 |
| 5,372,030 | 12/1994 | Prussia et al. ............................ 73/37 |

FOREIGN PATENT DOCUMENTS

| | | | |
|---|---|---|---|
| 1936556 | 6/1970 | Germany ................................ 73/37.6 |
| 3050379 | 7/1983 | Germany ................................ 73/37 |
| 204745 | 11/1984 | Japan ...................................... 73/52 |
| 250031 | 10/1989 | Japan ...................................... 73/52 |
| 652257 | 4/1951 | United Kingdom ...................... 73/52 |

*Primary Examiner*—Hezron E. Williams
*Assistant Examiner*—Daniel S. Larkin
*Attorney, Agent, or Firm*—Fish & Richardson P.C.

[57] ABSTRACT

To detect an unpressurized moving container, a fluid such as air is directed at the moving container. Thereafter, a level of deflection of the moving container resulting from the directed fluid is detected. An unpressurized container is indicated when the detected level of deflection exceeds a threshold level. Deflection may be detected by directing a pulse of air or a continuous stream of air against the container. The system is particularly useful in detecting unpressurized, thin-walled aluminum cans.

37 Claims, 6 Drawing Sheets

DETECTION OF UNPRESSURIZED MOVING CONTAINERS

BACKGROUND OF THE INVENTION

The invention relates to detection of unpressurized moving containers, particularly containers such as thin-walled aluminum cans.

Thin-walled aluminum cans, which are commonly used for storing beverages and other products, are typically filled and sealed on high speed canning lines. For quality control purposes, the cans must be inspected after filling and sealing to ensure that they have been properly sealed. Due to the operating speeds of many canning lines (e.g., 2400 cans per minute), this inspection must be extremely fast, and, for commercial reasons, the inspection must be extremely accurate.

One technique for detecting improperly sealed, or "unpressurized" cans in a stream of cans is to invert the cans and submerge them in a hot water bath. This causes air in each can to expand and to force the beverage or other products out of an improperly sealed can through any defect in the seal near the top of the can. The cans are then returned to their normal orientation, and the liquid level in each can is checked using, for example, radioactive isotopes or x-rays. If the liquid level in a can is below normal, this indicates that the can's seal is defective and the can is unpressurized, or that the can was underfilled, and that the can therefore must be rejected.

SUMMARY OF THE INVENTION

The invention features detection of an unpressurized moving container in a stream of moving containers by directing a fluid such as air against the side of each moving container and measuring any resulting deflection in the moving container. If the deflection exceeds a threshold amount, this indicates that the container is unpressurized and has a defective seal. In most embodiments, the unpressurized container is rejected. Because this approach does not require physical manipulation of the container, it is particularly amenable to high speed canning lines such as those used in filling and sealing thin-walled aluminum cans.

In one aspect, generally, the invention features directing a pulse of air against the side of a moving container, such as a thin-walled aluminum can, and detecting a level of deflection of the side of the container resulting from the pulse. If this level exceeds a threshold, then the container is unpressurized.

Specific embodiments may include one or more of the following features. First, to prevent the pulse of air from moving the container, and to ensure that any displacement measured actually results from displacement of the side of the container (rather than displacement of the entire container), a second pulse of air is directed against a side of the container opposite the side at which the first pulse is directed. These two pulses counteract each other and prevent the container from moving. To enhance the accuracy of the deflection measurement, the deflection of the second side may also be detected so that the deflection levels of the first and second sides of the container can be combined to produce a deflection level for the container.

Typically, the level of deflection is determined by measuring the actual profile of the side of the container, generating an expected profile for the side of the container, and subtracting the expected profile from the actual profile to produce a deflection profile. This deflection profile is then used to determine the level of deflection resulting from the pulse of air. The actual profile is typically measured using a laser displacement sensor.

When actual profiles for two sides of the container are employed, expected profiles are generated for each side of the container and subtracted from the actual profiles to produce deflection profiles for each side of the container. The deflection profiles are then combined and a level of deflection is determined based on the combined deflection profile.

In another aspect, generally, the invention features directing a continuous stream of air against the side of a moving container, such as a thin-walled aluminum can, and detecting a level of deflection of the side of the container resulting from the stream. If this level exceeds a threshold, then the container is unpressurized.

Specific embodiments may include one or more of the following features. First, as discussed above, to prevent the stream of air from moving the container, and to ensure that any displacement measured actually results from displacement of the side of the container, a second stream of air is directed against a side of the container opposite the side at which the first stream is directed. As also discussed above, the accuracy of the deflection measurement may be enhanced by detecting the deflection level of the second side and combining this deflection level with that of the first side to produce a deflection level for the container.

The level of deflection is generally determined by measuring the actual profile of the side of the container at a position corresponding to the stream of air, measuring a reference profile for the side of the container at a position not corresponding to the stream of air, and subtracting the reference profile from the actual profile to produce a deflection profile. This deflection profile is then used to determine the level of deflection resulting from the stream of air. Both the actual profile and the reference profile are typically measured using laser displacement sensors.

When actual profiles for two sides of the container are employed, reference profiles measured for each side of the container are subtracted from the actual profiles to produce deflection profiles for each side of the container. The deflection profiles are then combined and a level of deflection is determined based on the combined deflection profile.

The invention is particularly useful with a container filling and sealing system having a conveyor for moving containers and a container rejector, wherein the invention is embodied in an unpressurized container detector to be mounted near the conveyor at a location upstream of the container rejector. In this embodiment, the invention includes an air source that directs air against the moving container, a detector that detects a level of deflection of the moving container resulting from the directed air, and a processor that indicates that the container is unpressurized when the detected level of deflection exceeds a threshold level, and signals the rejector to reject the unpressurized container. Typically, the processor is an electronic computer operable to process information from at least 2400 containers per minute.

Other features and advantages of the invention will be apparent from the following description of preferred embodiments, and from the claims.

DESCRIPTION OF PREFERRED EMBODIMENTS

Figure 1:
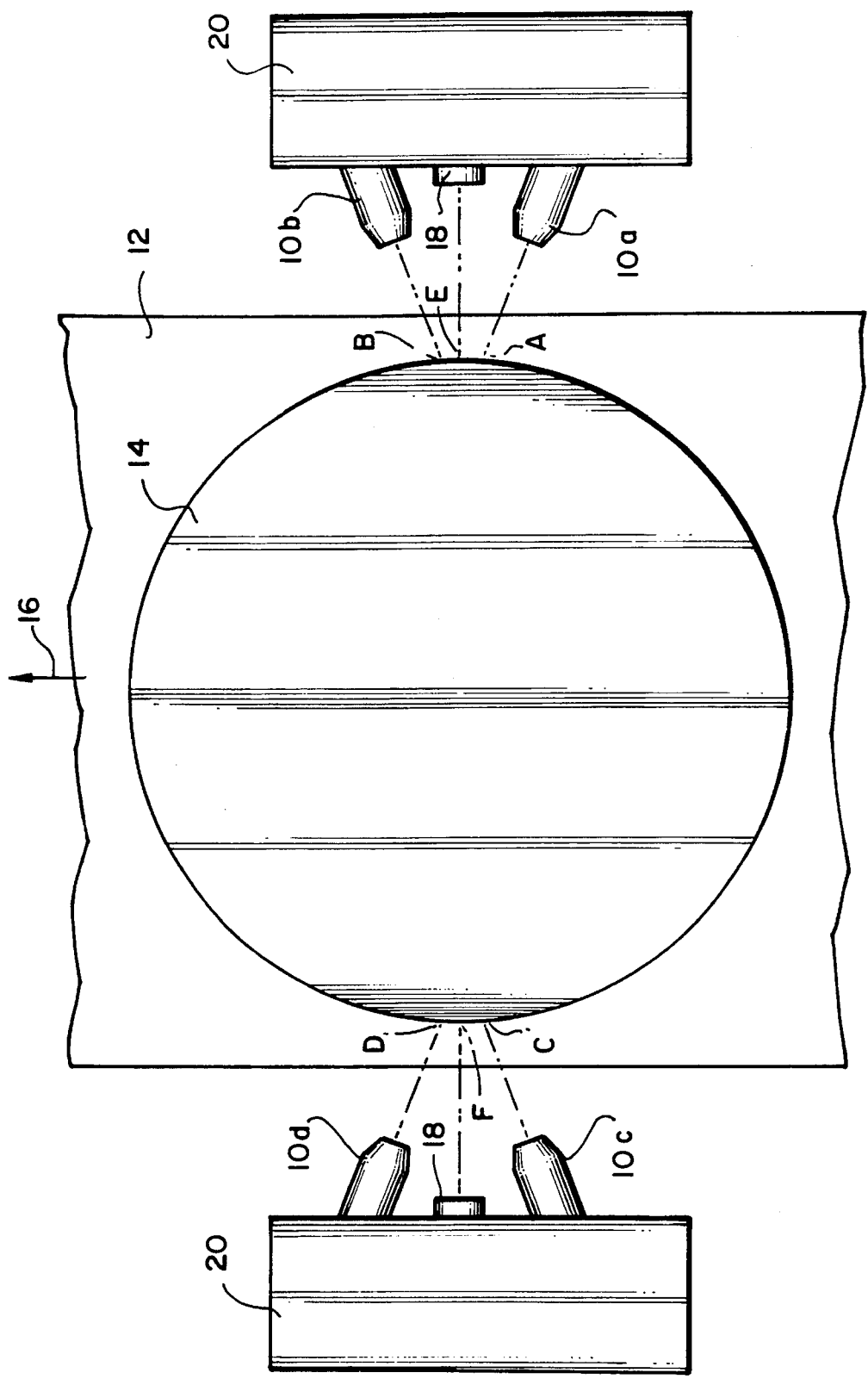
FIG. 1 is a schematic plan view of a can and a portion of an unpressurized can detection system.
Figure 2:
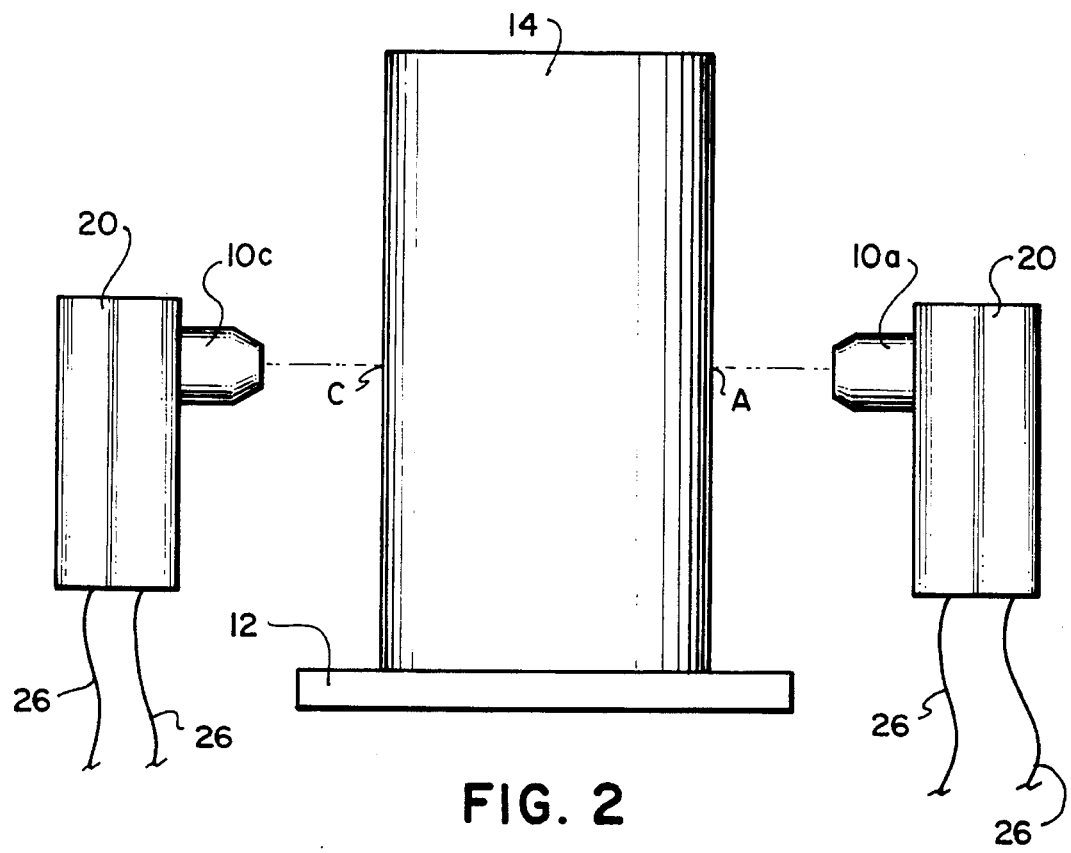
FIG. 2 is a side view of the can and the portion of the unpressurized can detection system of FIG. 1.

With reference to FIGS. 1 and 2, air nozzles 10a–10d (collectively nozzles 10) are positioned on each side of a conveyor 12 to direct air against the sides of a thin walled aluminum can 14 as the can moves in a direction 16 along the conveyor. Nozzle 10a is oriented to direct air at a point A about half way up the side of can 14, and nozzle 10b is oriented to direct air at a point B in the same horizontal plane as point A and spaced horizontally from point A by about a quarter of an inch. Similarly, nozzle 10c is oriented to direct air at a point C in the same horizontal plane as point A but on the opposite side of can 14, and nozzle 10d is oriented to direct air at a point D in the same horizontal plane as point C and spaced horizontally from point C by about a quarter of an inch. The spacing between points A and B (and points C and D) causes two distinct pressure concentrations at those points when air is directed thereon, and thereby causes the curved wall of can 14 between those points to buckle inward when the can has insufficient internal pressure. The placement of nozzles 10 on opposite sides of the can provides balanced air forces against the sides of the can and prevents the air from simply moving the can.

Laser displacement sensors 18 on each side of the can 14 measure the distance from fixed points, such as points on each sensor 18, to points (E and F) on the can wall, and are included with the nozzles 10 in sensor units 20 that are positioned on either side of conveyor 12. Suitable laser displacement sensors 18 include IDEC Models MX1A and MX1B available from IDEC Izumi Corporation of Osaka, Japan. Generally, air from nozzles 10 causes deflections in the wall of an unpressurized can 14 having magnitudes on the order of a half millimeter, while the measurements produced by sensors 18 are typically accurate to within a hundredth of a millimeter.

It should be understood that the term "unpressurized" refers to the absence of a normal pressure differential between the interior and exterior of a properly sealed container. That is, an unpressurized, or improperly sealed, container is a container having contents that are not at normal elevated pressure relative to external pressure due to a leak or improper pressurization.

Figure 3:
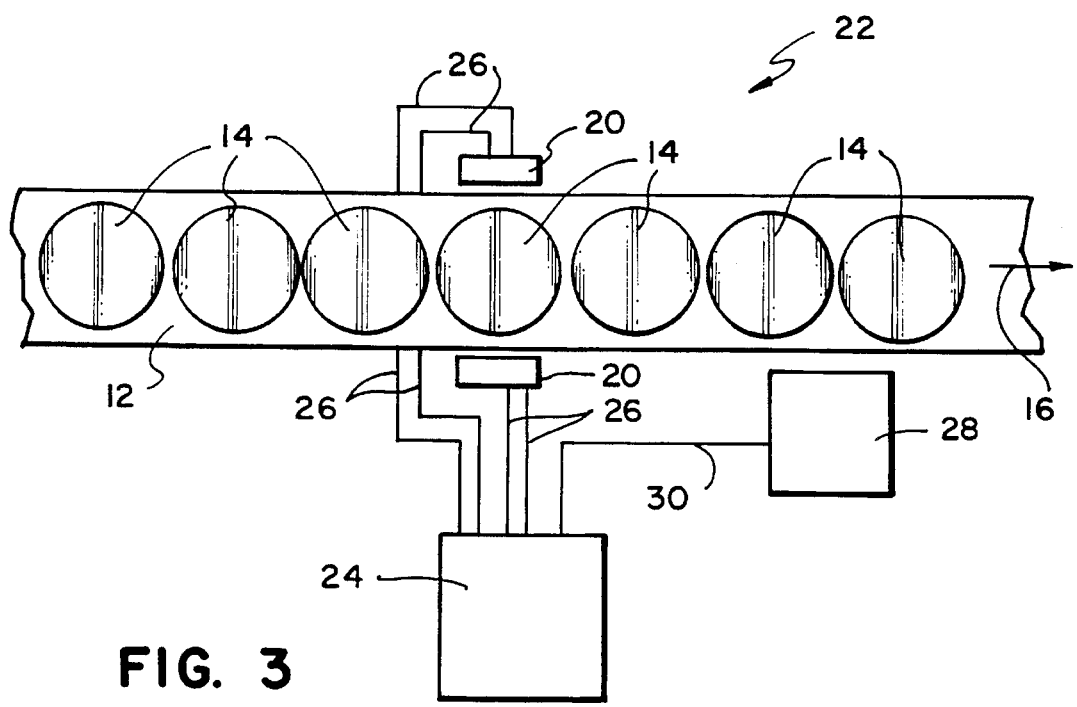
FIG. 3 is a schematic plan view of a portion of a canning line with the unpressurized can detection system of FIG. 1.

With reference also to FIG. 3, an unpressurized can detection system 22 includes two sensor units 20 that are connected to a processor 24 (e.g., a high-speed electronic microprocessor) through control wires 26. Processor 24 controls sensor units 20 and, based on measurements provided thereby, determines whether cans 14 are pressurized as the cans move along conveyor 12. When processor 24 determines that a can 14 is unpressurized, the processor signals a rejector 28 through a control wire 30 to reject that can (the unpressurized container may, if desired, be tracked by light beams from the location of the detection system 22 to the location of the rejector 28. The rejector 28, which is located downstream from the sensor units 20, rejects the unpressurized can 14 from the conveyor 12 when the unpressurized can 14 arrives at the rejector 28 by, for example, diverting the can on to a rejector conveyor (not shown).

Figure 4:
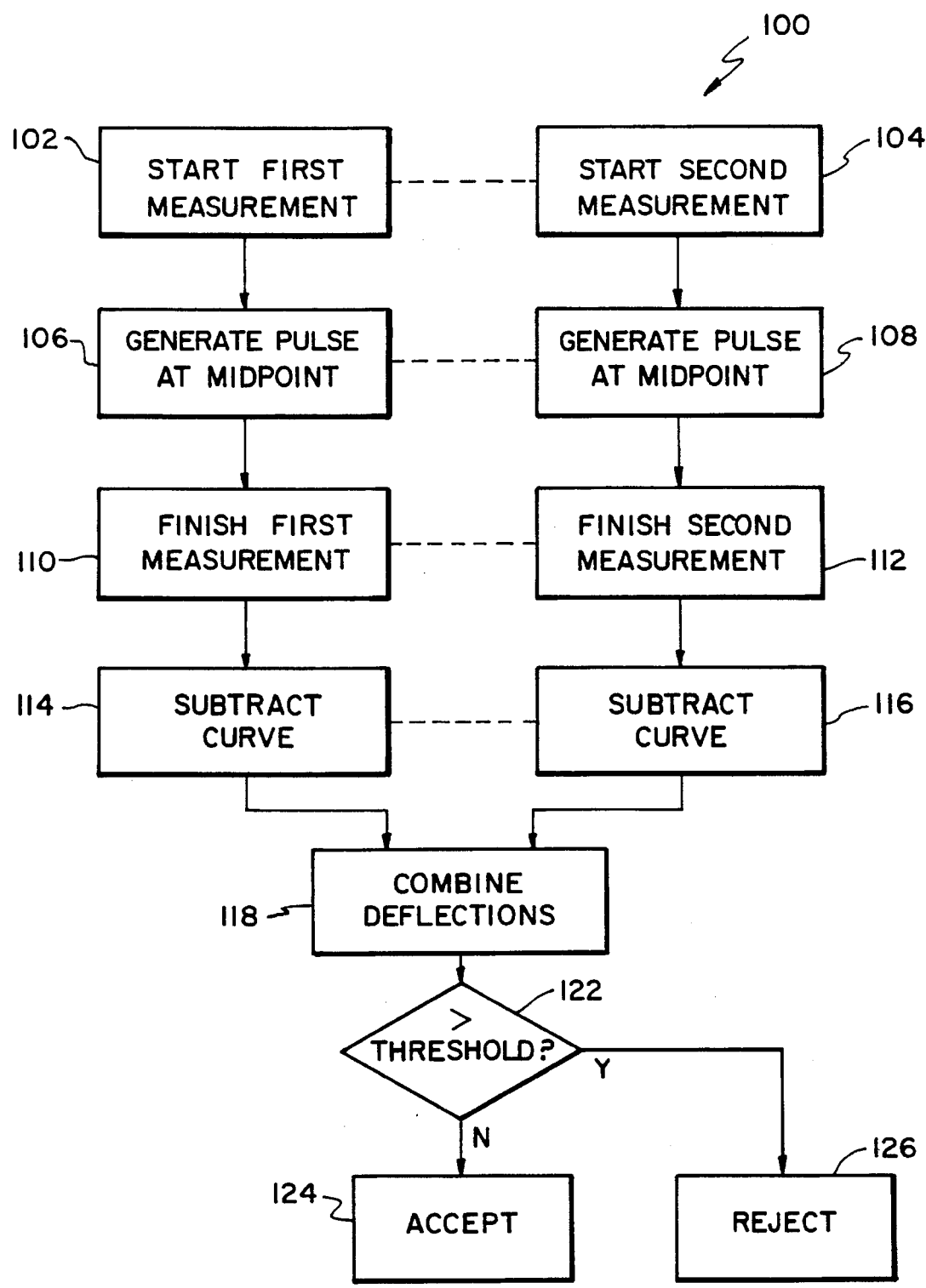
FIG. 4 is a flow chart of a procedure implemented by the unpressurized can detection system of FIG. 1.

With reference to FIG. 4, processor 24 determines whether to accept or reject a can 14 according to a procedure 100. Initially, when the distance measured by one of the laser displacement sensors 18 indicates the presence of a can 14 between sensor units 20, processor 24 begins measuring the shape of the can 14 by storing the measurements produced by the sensors 18 as a first data set corresponding to one of the sensors 18 (step 102) and a second data set corresponding to the other sensor 18 (step 104).

When the measurements produced by sensors 18 indicate that the midpoint of the can 14 is positioned between sensors 18 (i.e., the distances measured by both sensors 18 begin to increase as a narrower portion of the can is exposed to the sensors), processor 24 sends signals that cause nozzles 10a and 10b (step 106) and nozzles 10c and 10d (step 108) to produce air pulses, which, if the can 14 is unpressurized, will cause deflections in the side of can 14. A typical air pulse duration for a conveyor speed of 2400 twelve fluid ounce cans per minute is about ten milliseconds.

Thereafter, processor 24 continues to measure the shape of the can 14 by storing the measurements produced by the sensors 18 until one of the measurement produced by one of the sensors 18 indicates that the can 14 is no longer adjacent to a sensor 18, at which point processor 24 completes the measurements (steps 110 and 112).

After completing the measurements, processor 24 uses curve fitting techniques based on the measurements prior to the air pulses to predict the expected profile of the can 14 absent air pulses and subtracts this expected profile from the first data set (step 114) and the second data set (step 116) to produce first and second deflection measurements. Processor 24 then adds these two deflection measurements (step 118) to produce a combined deflection measurement. This addition process emphasizes the effect of deflection caused by the air pulses and minimizes the effects of irregularities in the shape of the can 14.

Thereafter, processor 24 determines that the can is unpressurized and rejects the can 14 (i.e., processor 24 transmits an appropriate signal to the rejector 28) (step 126) if the combined deflection for the time period corresponding to the air pulses exceeds a predetermined threshold level (step 122) corresponding to unpressurized cans, and otherwise accepts the can 14 (step 124).

Figure 5:
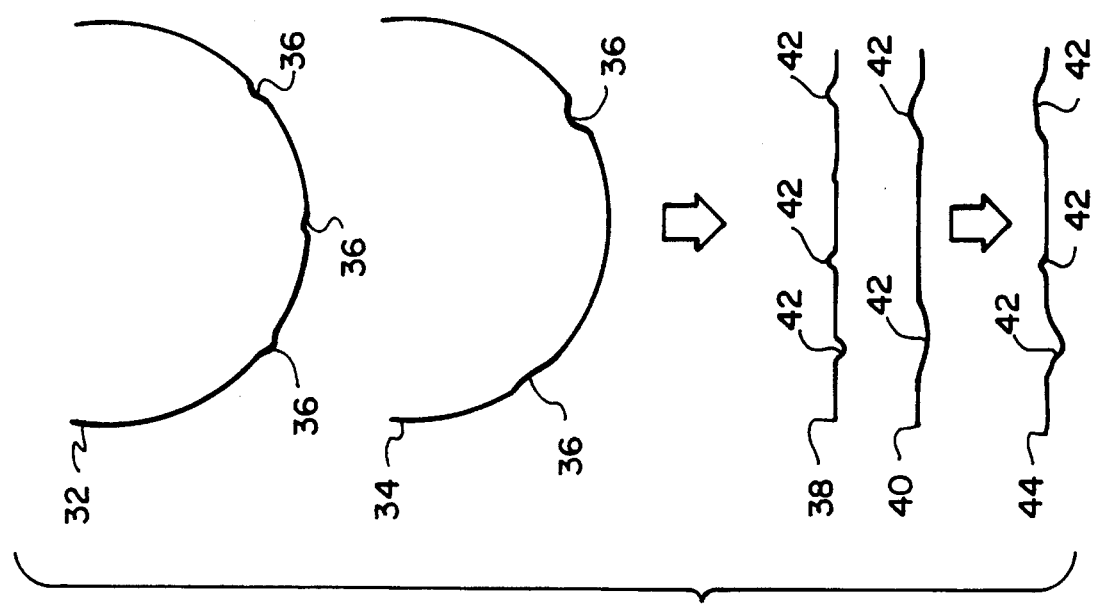

With reference to FIG. 5, for illustrative purposes a pressurized can 14 results in a first measurement 32 corresponding to the first data set and a second measurement 34 corresponding to the second data set. These measurements reflect profiles of a can whose side is generally unaffected by the air pulses, and instead show only the effects 36 of irregularities in the can 14. When the expected profile of the can 14 is subtracted from measurements 32 and 34, the resulting deflection measurements 38 and 40 show only minimal deflections 42 resulting from the irregularities in the can 14. These deflections 42, which similarly appear in the combined deflection measurement 44, do not exceed the predetermined threshold. A typical threshold for a twelve fluid ounce aluminum can is about a half millimeter.

Figure 6:
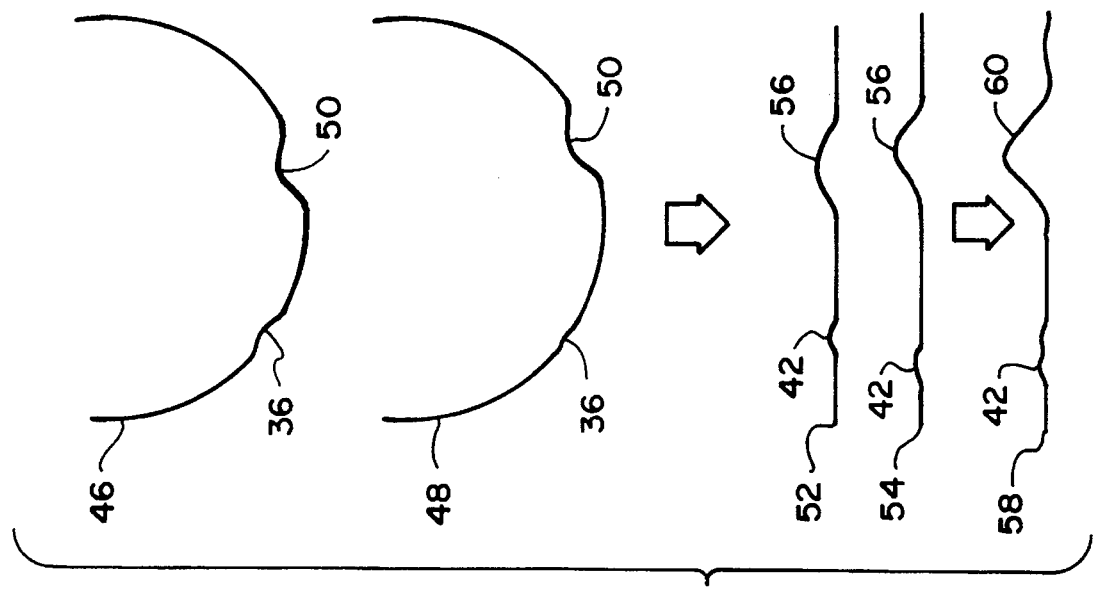
FIGS. 5 and 6 are composite graphs illustrating measurements used by the unpressurized can detection system of FIG. 1.

With reference to FIG. 6, for illustrative purposes an unpressurized can 14 results in a first measurement 46 corresponding to the first data set and a second measurement 48 corresponding to the second data set. These measurements include effects 50 of the air pulses in addition to effects 36 of irregularities in the can 14. When the expected profile of the can 14 is subtracted from measurements 46 and 48, the resulting deflection measurements 52 and 54 show minimal deflections 42 resulting from the irregularities in the can 14 and major deflections 56 resulting from the air pulses. Though the deflections 42, which similarly appear in the combined deflection measurement 58, may not exceed a predetermined threshold, the combined deflection 60 does.

Figure 7:
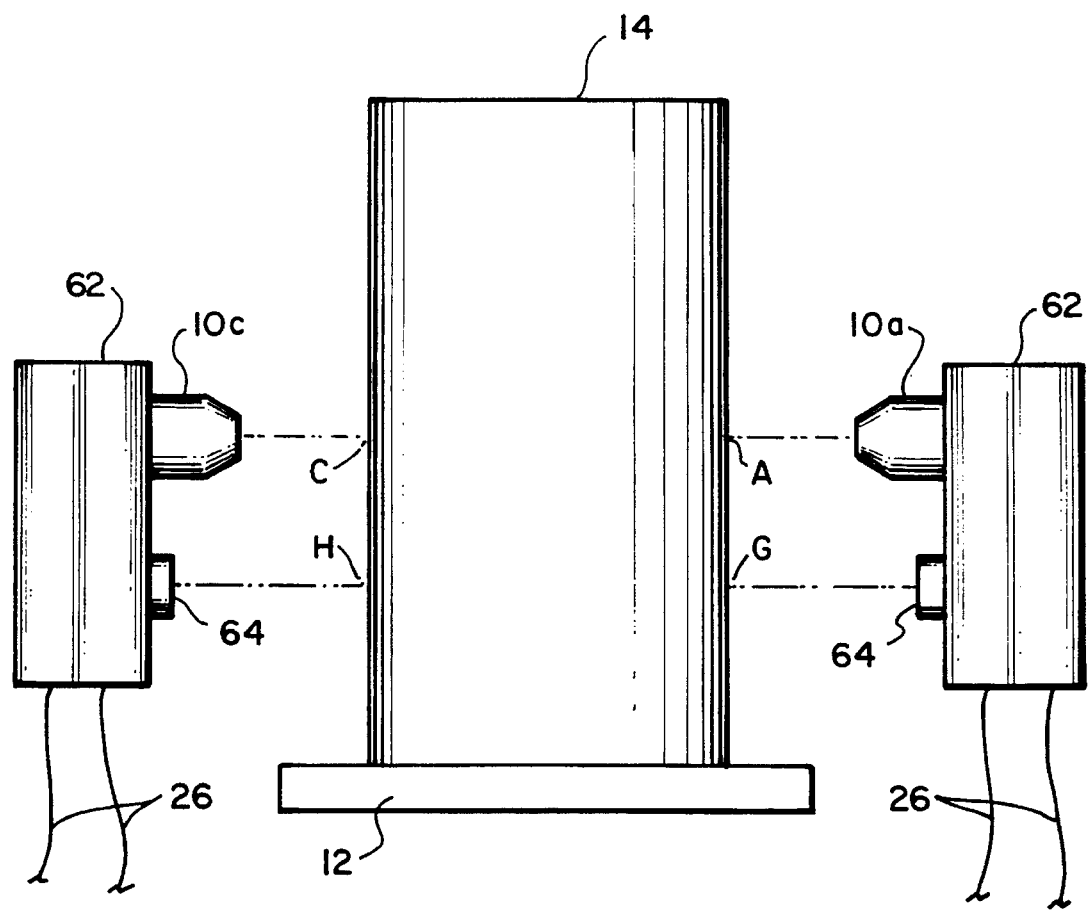
FIG. 7 is a side view of the can and the portion of an unpressurized can detection system.

With reference to FIG. 7, in another approach air nozzles 10a–10d (10b and 10d are not shown) are oriented in a manner similar to those of the detection system illustrated in FIGS. 1 and 2, but produce continuous streams of air rather than air pulses. Laser displacement sensors 18 are positioned on each side of the can 14 as discussed above. In addition, sensor units 62 include reference laser displacement sensors 64 positioned to measure the distance from fixed points to points (G and H) on the can wall directly below the points measured by sensors 18. Sensors 64 are connected to a processor 24 in a manner similar to the sensor units 20 of the system 22 shown in FIG. 3. (See FIG. 1 for the location of sensors 18 and nozzles 10b, 10d.)

Generally, the air stream from nozzles 10 causes an overall deflection in the wall of an unpressurized can 14 in the plane measured by sensors 18 that is not produced in the plane measured by reference sensors 64. Thus, by subtracting the measurements produced by reference sensors 64 from those produced by sensors 18, the deflection caused by the air stream can be determined and compared to a threshold level corresponding to an unpressurized can.

Figure 8:
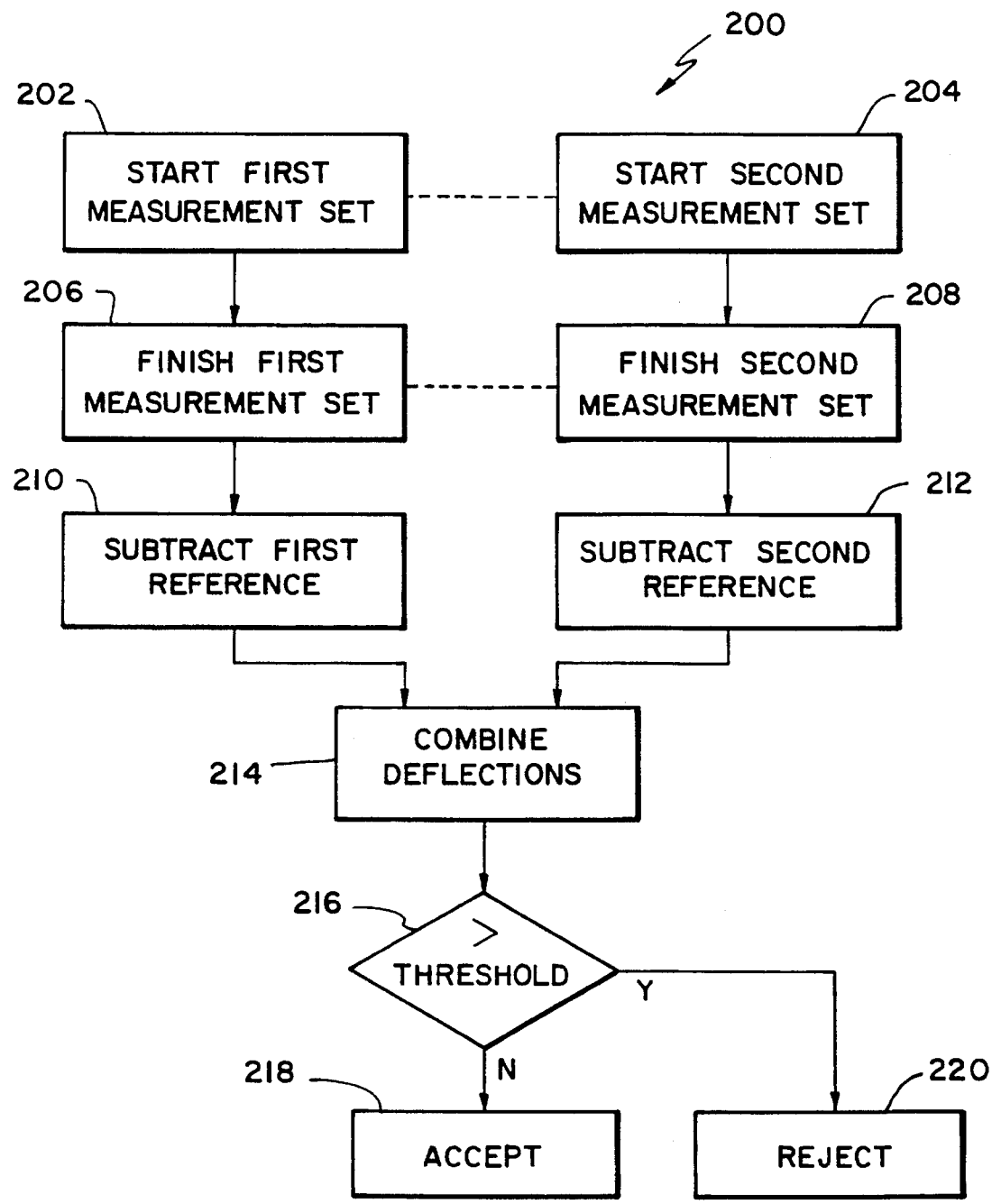
FIG. 8 is a flow chart of a procedure implemented by the unpressurized can detection system of FIG. 7.

With reference to FIG. 8, processor 24 determines whether to accept or reject a can 14 according to a procedure 200. Initially, when the distance measured by one of the laser displacement sensors 18 indicates that a can 14 is between sensor units 62, processor 24 begins measuring the shape of the can 14 by storing the measurements produced by the sensors 18 and the reference sensors 64 as a first measurement set corresponding to one of the sensors 18 and one of the reference sensors 64 (step 202) and a second measurement set corresponding to the other sensor 18 and the other reference sensor 64 (step 204). Thereafter, processor 24 continues to measure the shape of the can 14 by storing the measurements produced by the sensors 18 and the sensors 64 until the measurements produced by one of the sensors 18 indicate that the can 14 is no longer adjacent to a sensor 18, at which point processor 24 completes the measurements (steps 206 and 208).

After completing the measurements, processor 24 subtracts the reference measurement produced by the first reference sensor 64 from the measurement produced by the first sensor 18 (step 210) and the reference measurement produced by the second reference sensor 64 from the measurement produced by the second sensor 18 (step 212) to produce deflection measurements. Processor 24 then combines these deflection measurements (step 214) to produce a combined deflection measurement. As noted above, this addition process emphasizes the effect of deflection caused by the air pulses and minimizes the effects of irregularities in the shape of the can 14.

Thereafter, processor 24 determines that the can is unpressurized and rejects the can 14 (step 220) if the combined deflection exceeds a predetermined threshold level (step 216) corresponding to unpressurized cans, and otherwise accepts the can 14 (step 218).

The invention may be in the form of other embodiments. For example, a single sensor 18, or a single sensor 18 and a single reference sensor 64, could be used. Similarly, the system could employ only a single nozzle 10, or a single nozzle 10 on each side of the conveyor 12. In addition, the laser displacement sensors described above could be replaced with inductance sensors, capacitance sensors or pneumatic gauging devices.

What is claimed is:

1. A method of detecting an unpressurized moving container, comprising:

directing a fluid against the moving container, detecting a level of deflection of the moving container resulting from the directed fluid, and indicating that the container is unpressurized when the detected level of deflection exceeds a threshold level.

2. The method of claim 1, wherein the fluid is air and the step of directing comprises directing a first pulse of air against a first side of the moving container, and the step of detecting comprises detecting a level of deflection of the first side of the moving container resulting from the first pulse of air.

3. The method of claim 2, further comprising directing a second pulse of air against a second side of the moving container, the second side being located opposite the first side.

4. The method of claim 3, wherein the step of detecting further comprises:

detecting a level of deflection of the second side of the moving container resulting from the second pulse of air, and combining the levels of deflection of the first and second sides of the moving container to produce a level of deflection for the moving container.

5. The method of claim 2, wherein the step of detecting further comprises:

measuring the actual profile of the first side of the container, generating an expected profile for the first side of the container, subtracting the expected profile from the actual profile to produce a deflection profile, and detecting a level of deflection of the side of the moving container resulting from the first pulse of air based on the deflection profile.

6. The method of claim 5, further comprising measuring the actual profile of the first side of the container using a laser displacement sensor.

7. The method of claim 2, further comprising:

measuring the actual profile of the first side of the container;

generating a first expected profile for the first side of the container;

subtracting the first expected profile from the actual profile of the first side of the container to produce a deflection profile for the first side of the container;

directing a second pulse of air against a second side of the moving container, the second side being located opposite the first side;

measuring the actual profile of the second side of the container;

generating a second expected profile for the second side of the container;

subtracting the second expected profile from the actual profile of the second side of the container to produce a deflection profile for the second side of the container;

combining the deflection profiles for the first and second sides of the container to produce a combined deflection profile; and detecting a level of deflection of the sides of the moving container resulting from the pulses of air based on the combined deflection profile.

8. The method of claim 7, further comprising measuring the actual profile of the first and second sides of the container using laser displacement sensors.

9. The method of claim 7, wherein the container comprises a thin-walled aluminum can.

10. The method of claim 1, wherein the fluid is air and the step of directing comprises directing a first continuous stream of air against a first side of the moving container, and the step of detecting comprises detecting a level of deflection of the first side of the moving container resulting from the first continuous stream of air.

11. The method of claim 10, further comprising directing a second continuous stream of air against a second side of the moving container, the second side being located opposite the first side.

12. The method of claim 11, wherein the step of detecting further comprises:

detecting a level of deflection of the second side of the moving container resulting from the second stream of air, and combining the levels of deflection of the first and second sides of the moving container to produce a level of deflection for the moving container.

13. The method of claim 10, wherein the step of detecting further comprises:

measuring the actual profile of the first side of the container at a position corresponding to the first stream of air, measuring a reference profile of the first side of the container at a position not corresponding to the first stream of air, subtracting the reference profile from the actual profile to produce a deflection profile, and detecting a level of deflection of the side of the moving container resulting from the first stream of air based on the deflection profile.

14. The method of claim 13, further comprising measuring the actual and reference profiles of the first side of the container using laser displacement sensors.

15. The method of claim 10, further comprising:

measuring the actual profile of the first side of the container at a position corresponding to the first stream of air;

generating a first reference profile for the first side of the container at a position not corresponding to the first stream of air;

subtracting the first reference profile from the actual profile of the first side of the container to produce a deflection profile for the first side of the container;

directing a second continuous stream of air against a second side of the moving container, the second side being located opposite the first side;

measuring the actual profile of the second side of the container at a position corresponding to the second stream of air;

generating a second reference profile for the second side of the container at a position not corresponding to the second stream of air;

subtracting the second reference profile from the actual profile of the second side of the container to produce a deflection profile for the second side of the container;

combining the deflection profiles for the first and second sides of the container to produce a combined deflection profile; and detecting a level of deflection of the sides of the moving container resulting from the streams of air based on the combined deflection profile.

16. The method of claim 15, further comprising measuring the first and second reference profiles and the actual profiles of the first and second sides of the container using laser displacement sensors.

17. The method of claim 15, wherein the container comprises a thin-walled aluminum can.

18. The method of claim 1 wherein said fluid is air, further comprising:

measuring the actual profile of the moving container using a laser displacement sensor, and detecting the level of deflection of the moving container resulting from the directed air based on the actual profile of the moving container.

19. The method of claim 1, further comprising rejecting the container when the detected level of deflection exceeds the threshold level.

20. The method of claim 1, wherein the container comprises a thin-walled aluminum can.

21. An unpressurized container detection system, comprising:

a fluid source for directing fluid against the moving container, a detector operable to detect a level of deflection of the moving container resulting from the directed fluid, and a processor operable to indicate that the container is unpressurized when the detected level of deflection exceeds a threshold level.

22. The system of claim 21, wherein said fluid source is an air source and the air source is configured and positioned to direct a pulse of air against a first side of the moving container, and the detector is configured to detect a level of deflection in the first side of the container.

23. The system of claim 22, further comprising a second air source configured and positioned to direct a second pulse of air against a second side of the moving container, the second side being located opposite the first side.

24. The system of claim 23, further comprising a second detector configured to detect a level of deflection in the second side of the container, and wherein the processor is operable to combine the levels of deflection of the first and second sides of the moving container to produce a level of deflection for the moving container.

25. The system of claim 22, wherein the detector is configured to measure the actual profile of the first side of the container, and the processor is configured to:

generate an expected profile for the first side of the container, subtract the expected profile from the actual profile to produce a deflection profile, and detect a level of deflection of the side of the moving container resulting from the first pulse of air based on the deflection profile.

26. The system of claim 25, wherein the detector comprises a laser displacement sensor.

27. The system of claim 26, wherein the container comprises a thin-walled aluminum can.

28. The system of claim 21, wherein the fluid source is an air source and
the air source is configured and positioned to direct a first continuous stream of air against a first side of the moving container, and the detector is configured to detect a level of deflection in the first side of the container.

29. The system of claim 28, further comprising a second air source configured and positioned to direct a second continuous stream of air against a second side of the moving container, the second side being located opposite the first side.

30. The system of claim 29, further comprising a second detector configured to detect a level of deflection in the second side of the container, and wherein the processor combines the levels of deflection of the first and second sides of the moving container to produce a level of deflection for the moving container.

31. The system of claim 28, further comprising a reference detector configured to measure the actual profile of the first side of the container at a position not corresponding to the first continuous stream of air, and wherein
the detector is configured to measure the actual profile of the first side of the container at a position corresponding to the first continuous stream of air, and
the processor is configured to:
subtract the reference profile from the actual profile to produce a deflection profile, and
detect a level of deflection of the side of the moving container resulting from the first pulse of air based on the deflection profile.

32. The system of claim 31, wherein the detector and reference detectors comprise laser displacement sensors.

33. The system of claim 31, wherein the container comprises a thin-walled aluminum can.

34. The system of claim 21, wherein the detector comprises a laser displacement sensor.

35. The system of claim 21, wherein the container comprises a thin-walled aluminum can.

36. The system of claim 21, wherein the processor is an electronic computer operable to process information from at least 2400 containers per minute.

37. For use with a container filling and sealing system having a conveyor for moving containers and a container rejector, an unpressurized container detector to be mounted near said conveyor at a location upstream of the container rejector, the unpressurized can detector comprising:
a fluid source for directing a fluid against the moving container,
a detector operable to detect a level of deflection of the moving container resulting from the directed fluid, and
a processor operable to indicate that the container is unpressurized when the detected level of deflection exceeds a threshold level and to signal the rejector to reject the unpressurized container.

* * * * *